W. KELSO.
DRAFT RIGGING MECHANISM.
APPLICATION FILED OCT. 29, 1918.
1,311,699.
Patented July 29, 1919.
4 SHEETS—SHEET 1.
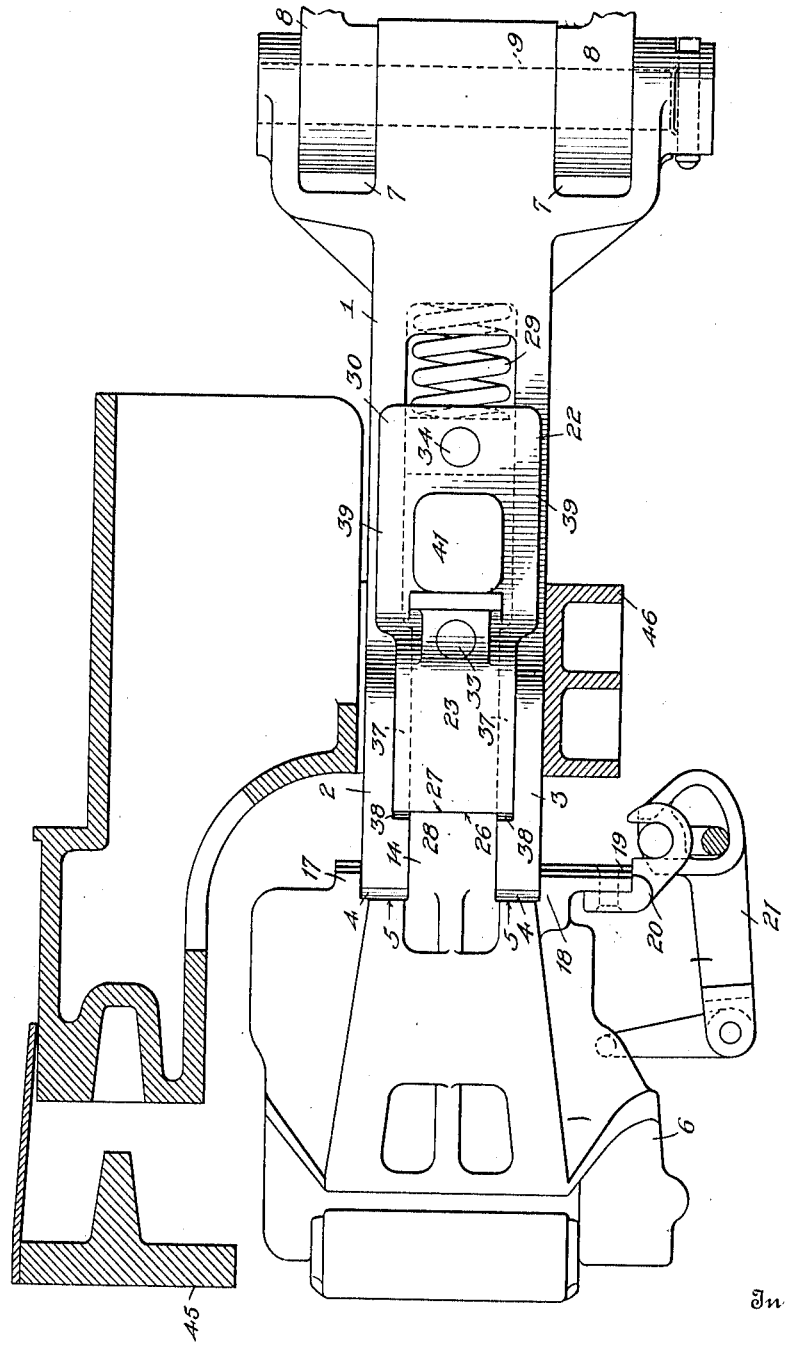
Witness
Edwin L. Bradford
Inventor
William Kelso
By Ritter & Ritter
his Attorneys

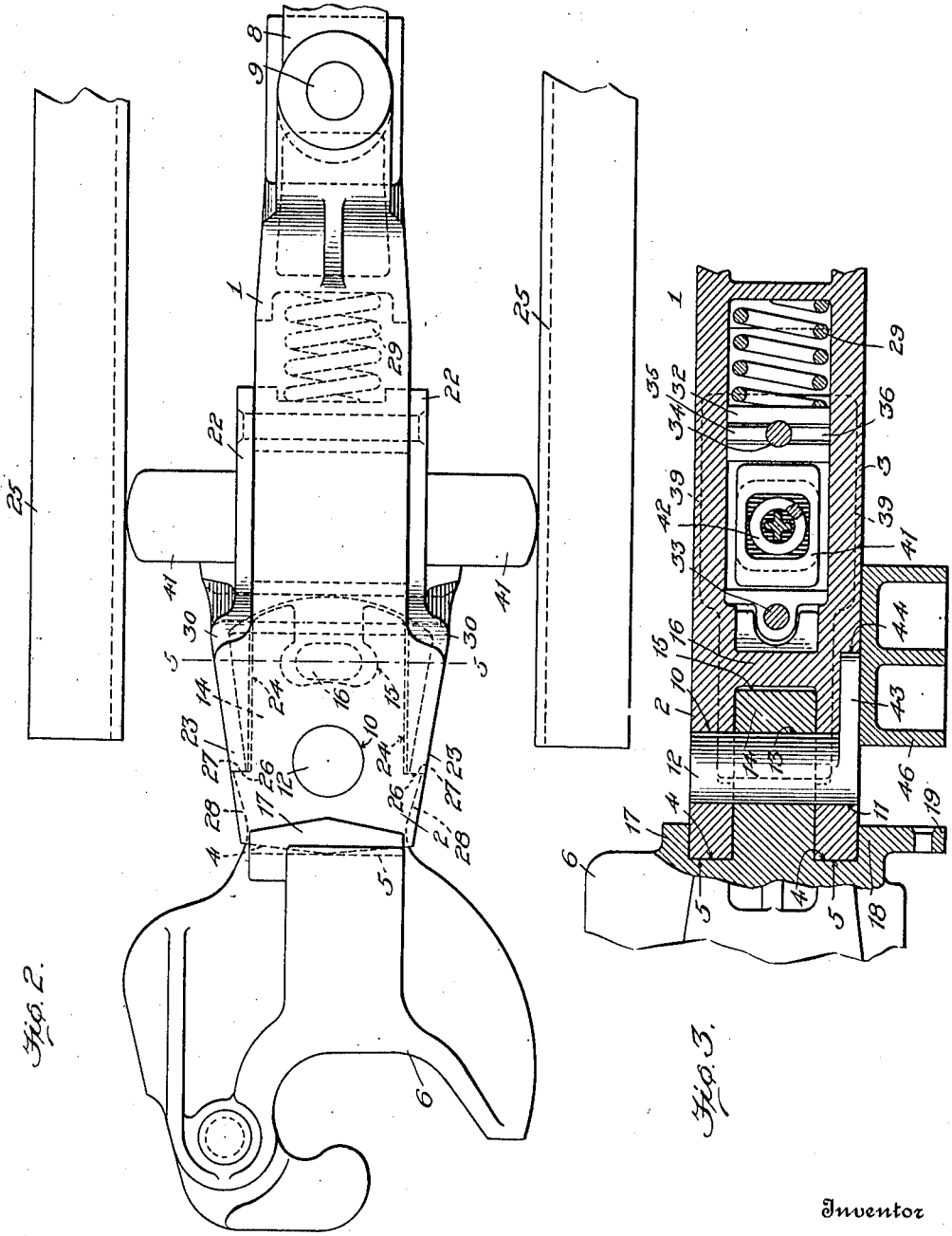

W. KELSO.
DRAFT RIGGING MECHANISM.
APPLICATION FILED OCT. 29, 1918.
1,311,699.
Patented July 29, 1919.
4 SHEETS—SHEET 3.
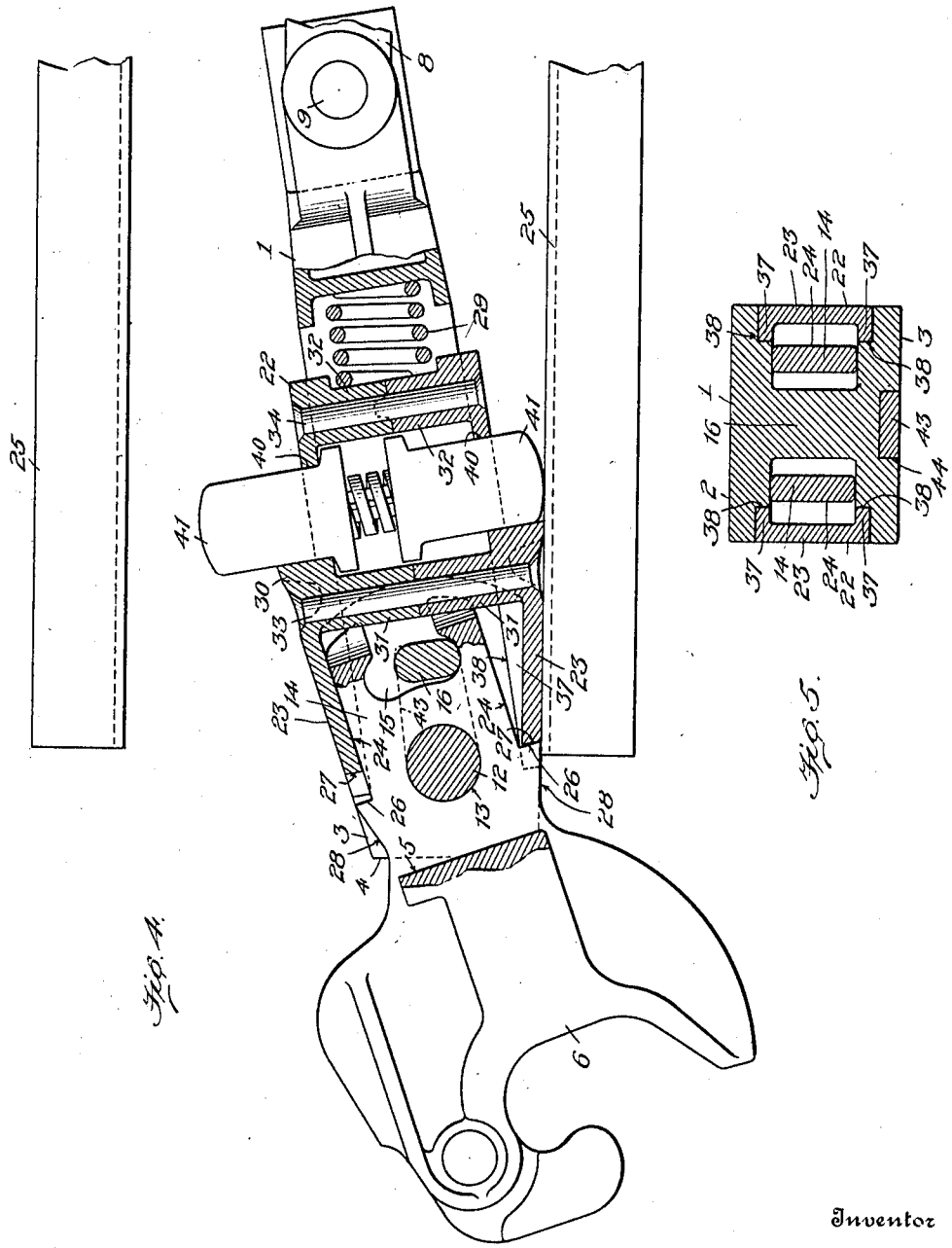

W. KELSO.
DRAFT RIGGING MECHANISM.
APPLICATION FILED OCT. 29, 1918.

1,311,699.

Patented July 29, 1919.
4 SHEETS—SHEET 4.

UNITED STATES PATENT OFFICE.

WILLIAM KELSO, OF PITTSBURGH, PENNSYLVANIA, ASSIGNOR TO THE McCONWAY & TORLEY COMPANY, OF PITTSBURGH, PENNSYLVANIA, A CORPORATION OF PENNSYLVANIA.

DRAFT-RIGGING MECHANISM.

1,311,699.  Specification of Letters Patent.  Patented July 29, 1919.

Application filed October 29, 1918. Serial No. 260,180.

*To all whom it may concern:*

Be it known that I, WILLIAM KELSO, a citizen of the United States, residing at Pittsburgh, in the county of Allegheny and State of Pennsylvania, have invented certain new and useful Improvements in Draft-Rigging Mechanism; and I do hereby declare the following to be a full, clear, and exact description of the invention, such as will enable others skilled in the art to which it appertains to make and use the same.

My invention relates to draft rigging for railway rolling stock and particularly to draft rigging especially suitable for application to passenger cars. The principal objects of the invention are to simplify and strengthen the mechanism as a whole; to permit extended lateral swinging of the coupler head with respect to the stem on which it is pivotally mounted; to afford ample bearings for limiting the swinging of the head and for efficiently resisting the lateral strains imparted to the coupler stem by the head; to fortify and reinforce the forward arms of the stem against spreading or separation inducing distortion and breakage of the pivot pin and stem; and to provide a connecting pivot pin for the head and stem rendering it feasible, within the limits of space now existing on present passenger cars, to employ pivoted coupler heads of types exhibiting a comparatively great extension rearward from the pulling face of the coupler. These and other objects, features and advantages of the invention are effected by particular combinations of the coupler head, the stem, the mechanism for centering the head with respect to the stem, and the pivot pin connecting the head and stem, and by special structural features of these elements, as will hereinafter appear.

In the drawings illustrating the best mode in which I have contemplated applying the principle of the invention, Figure 1 is a view, partly in side elevation and partly in section, showing a draft rigging mechanism embodying my invention applied to the end of a passenger car, the parts being in normal position.

Fig. 2 is a plan view of the draft rigging illustrated in Fig. 1, portions of the car sills being also shown.

Fig. 3 is a detail view, partly in elevation and partly in vertical central section, of the draft rigging shown in Fig. 1.

Fig. 4 is a view, partly in plan and partly in horizontal section, illustrating the positions assumed by the parts when the draft rigging swings to the limit of its lateral displacement.

Fig. 5 is a detail sectional view on the line 5—5, Fig. 2.

Fig. 6 is a detail side elevation of the forward end of the coupler stem.

Fig. 7 is a detail sectional view of the coupler stem, taken on the line 7—7, Fig. 6.

Fig. 8 is a detail side elevation of one of the members of the yieldingly supported slidable frame by which the coupler head is centered.

Fig. 9 is a detail sectional view on the line 9—9, Fig. 8.

Fig. 10 is a view corresponding to Fig. 1, but illustrating a modification of the invention.

In the drawings illustrating the invention, the scope whereof is pointed out in the claims, the coupler stem 1 of the draft rigging mechanism is shown as being formed with a bifurcated forward end comprising an upper arm or plate 2 and a lower arm or plate 3, these arms being preferably convexly beveled at their forward ends 4 so as to contact or substantially contact the neighboring vertical faces 5 of the coupler head 6 without interfering with the pivotal movement of the latter. The rear end of the coupler stem is preferably fashioned with upper and lower spaced recesses 7 adapted to receive the forward ends of the arms 8 of the well known type of draft yoke, the pivot pin 9 which connects the stem and yoke thereby offering quadruple shear resistance to pulling strains.

The upper arm 2 of the yoke is provided near its forward end with a pivot pin opening 10 and the lower arm 3 has a correspondingly located pivot pin opening 11. The pivot pin 12 by which the coupler head 6 is pivotally mounted on the coupler stem 1 passes through the openings 10 and 11 of the respective arms 2 and 3 and through the alined opening 13 formed in the portion 14 of the coupler head lying between said arms.

The inner end of the rearwardly extending projection 14 of the coupler head is suitably slotted or recessed, as at 15, to enable it to straddle an upright tie bar or post 16 that is preferably employed for integrally uniting and bracing the upper and lower arms 2 and 3 of the coupler stem a short distance to the rear of the pivot pin 12. As shown in Fig. 4, the recess 15 and tie bar 16 are preferably of such form that the bar or post forms a stop or abutment limiting the lateral swinging of the coupler head 6, thus receiving lateral strain imparted to the stem 1 by the rearwardly extending portion 14 of the coupler head at the limit of lateral displacement of the head.

To further fortify the arms 2 and 3 of the stem against separation or spreading the coupler head 6 is preferably provided with rearwardly extending shoulders, projections or flanges, 17 and 18, which are spaced vertically from the central portion 14 of the head so as to overlap respectively the outer ends of the upper and lower arms 2 and 3 of the stem 1 in advance of the pivot pin 12. As shown in Figs. 1 and 3 the flange 18 may be provided with a depending portion 19 serving as a support for the bracket 20 of a release rigging 21 by which the locking mechanism of the coupler is actuated.

As a further means for receiving the lateral strain imparted to the stem 1 by the coupler head 6 at the limit of its pivotal movement, as well as for the purpose of increasing the arc through which the head may swing upon the pivot pin 12, the centering slide or frame 22 is formed with forwardly converging lateral walls 23 against the interior surfaces of which (as shown in Fig. 4) the respectively adjacent faces 24 of the rearwardly extending projection 14 of the coupler head are adapted to abut when the head reaches the limit of its swing. At the end of the pivotal movement of the coupler stem 1 the exterior surfaces of the walls 23, because of their forward convergence or inclination, have extended contact with the corresponding draft sills or center sills 25 of the car, thus efficiently supporting the stem against distortion and affording a large bearing area to resist wear.

The rearwardly extending portion 14 of the coupler head is provided on opposite sides of the pivot pin 12 with vertically extending shoulders 26 adapted to engage the corresponding faces or shoulders 27 at the forward end of the centering slide 22. The lateral faces 28 of the coupler head converge in advance of the shoulders 26 so that, as illustrated in Fig. 4, the coupler head may execute a wide pivotal movement with respect to the coupler stem before contacting the car sills 25. When the coupler head 6 rotates on the pivot pin 12 one or the other of the shoulders 26, depending upon the direction of rotation, presses against the corresponding forward face 27 of the centering slide 22, thereby compressing the spring 29 interposed between the rear end of the slide and the coupler stem. Subsequent expansion of the spring 29 restores the slide to normal position, thus causing the coupler head to be returned to central position with respect to the coupler stem 1.

The centering slide or frame 22 is preferably constructed of two counterpart members 30 each of which is provided with a plurality of hollow lugs 31 and 32 respectively adapted to receive rivets 33 and 34 by which the counterpart members 30 are rigidly united. The end of each lug 32 is preferably provided with a projection 35 and a similar recess 36, so that when the counterpart members 30 are assembled the projection 35 upon one member enters the corresponding recess in the other member, thus locking the parts against longitudinal separation and thereby insuring their proper transverse alinement.

To guide the centering slide 22 and maintain it in proper working position on the coupler stem, the forward portion of each section 30 of the slide is preferably formed with upper and lower inwardly extending guide ribs or flanges 37 that are adapted to coöperate with corresponding guideways or seats 38 with which the coupler stem is provided near its outer end; and the rear portion of each section 30 of the slide is also preferably provided with vertically extending flanges 39 which overlap the outer faces of the upper and lower arms or branches, 2 and 3 respectively, of the stem 1.

Each section of the centering slide is provided with an aperture 40 through which a spring-cup 41 extends, and a spring 42 normally operates to maintain the spring-cups or boxes in a position enforcing a central position of the coupler stem. This feature of the construction and the mode of operation thereof are well known and are fully described in my Patent No. 950,485, granted March 10, 1910.

The pivot pin 12 by which the coupler head 6 is pivotally mounted on the coupler stem 1 is preferably provided at one end with a rearwardly extending tongue 43 projecting outwardly from the body of the pin. As shown in dotted lines in Fig. 4 the tongue preferably tapers rearwardly and, in order to prevent undue weakening of the coupler stem, is preferably of less width laterally and less height vertically than the respectively corresponding dimensions of the adjacent arm 3 of the stem. On its under side and extending rearwardly from the pivot pin opening 11, the lower arm 3 of the coupler stem is provided with a recess 44 receiving the tongue 43 of the pivot pin and preferably shaped to conform thereto. The recess 44, being to the rear of the pivot pin opening 11, does not decrease the bearing area of the pin against the forward portion of the wall of the pivot pin hole 11 in draft, which is the point of greatest strain in pulling. In buffing, the car buffers 45 absorb the major portion of the strain so that the diminution of bearing surface for the pivot pin due to providing the recess 44 is not practically objectionable. Moreover, as shown in the drawings, the tongue 43 may be long enough to allow its rear end to bear against the rear wall of the recess 44, thus increasing the buffing surface of the pivot pin 12 to that extent. By fitting in the recess 44 the tongue 43 prevents the pivot pin 12 from turning, which is advantageous in that wear of the coupler stem from this cause is prevented.

By employing a pivot pin of the described character as the means for connecting the coupler head and coupler stem, the pivotal axis of the coupler head may be located in any reasonable relation to the carry-iron 46 or to the chafing iron or tie plate 47 carried by the car, thus enabling its position to be suited to the type of coupler head 6 that may be employed, and at the same time rendering it possible to avail of the carry-iron or the chafing iron or tie plate as a means for retaining the pivot pin in place in all positions which the parts may assume in service. As shown in Fig. 3, it is preferred to locate the pivotal axis of the coupler head 6 a short distance in advance of the usual location of the carry-iron 46 when the coupler head used extends rearwardly a comparatively great distance from the pulling face of the coupler knuckle; and in order to insure retention of the pivot pin 12 in assembled relation the tongue 43 thereof, when in normal position, overlaps the carry-iron 46 (see Fig. 3) or chafing iron 47 (see Fig. 10) for a distance greater than the longitudinal travel of the coupler in draft, while the width of the carry-iron or chafing-iron is sufficient to prevent the pivot pin from passing to the rear thereof in buffing. The pin is thus maintained in assembled relation in all positions of buffing and pulling. To remove the pivot pin it is only necessary to remove or shift the carry-iron 46 or chafing-iron or tie-plate 47, as the case may be, from the path of withdrawal of the tongue 43 of the pivot pin, after which the pivot pin may be moved vertically and the coupler head 6 disconnected from the coupler stem.

In the construction shown in Fig. 10 the pivot pin 12 is inserted from above instead of below and accordingly the recess for its tongue 43 is formed in the upper arm 48 of the coupler stem instead of in the lower arm thereof. The coupler stem shown in this view is of the well-known built-up type involving upper and lower plates or arms 48 and 49, respectively. In this construction the coupler carry-iron is indicated at 50, the pivoted coupler head is shown at 51, and the buffer is indicated at 52.

I claim:

1. In draft rigging mechanism, the combination with a coupler stem, of a coupler head, and means for pivotally connecting said stem and head, said stem having spaced arms adapted to receive a portion of said head between them, and being provided rearwardly of the point of pivotal connection of said head and stem with means for rigidly connecting said spaced arms, said last named means also serving to limit the pivotal movement of said head with respect to said stem.

2. In draft rigging mechanism, the combination with a coupler stem, of a coupler head, and means for pivotally connecting said stem and head, said stem having spaced arms adapted to receive a portion of said head between them and being provided with a plurality of spaced means rigidly uniting said arms, one of said spaced means uniting said arms at their rear ends, and one of said spaced means uniting said arms rearwardly of the point of pivotal connection of said head and stem, and said coupler head being provided with a portion extending rearwardly beyond said last named means.

3. In draft rigging mechanism, the combination with a coupler stem, of a coupler head, and means for pivotally connecting said stem and head, said stem having spaced arms adapted to receive a portion of said head between them and being provided with means integrally uniting said arms intermediate of their ends at a point to the rear of the pivotal connection of said head and stem, and said coupler head being provided with a portion adapted to engage said means for uniting the arms of said stem.

4. In draft rigging mechanism, the combination with a coupler stem, of a coupler head, means for pivotally connecting said stem and head, and means for centering said head with respect to said stem, said centering means involving a slide reciprocatingly mounted on said stem and adapted to be actuated by said coupler head and having forwardly converging lateral walls receiving a portion of said coupler head between them.

5. In draft rigging mechanism, the combination with a coupler stem, of a coupler head, means for pivotally connecting said stem and head, and means for centering said head with respect to said stem, said centering means involving a slide reciprocatingly mounted on said stem, a spring interposed between said slide and stem, a plurality of spring-cups mounted on and laterally movable with respect said slide, and a spring interposed between said spring-cups, said slide having forwardly converging faces adapted to be engaged by a portion of said coupler head to limit the pivotal movement of said head.

6. In draft rigging mechanism, the combination with a coupler stem, of a coupler head, means for pivotally connecting said stem and head, and means for centering said head with respect to said stem, said centering means involving a slide reciprocatingly mounted on said stem and having forwardly converging walls adapted to receive between them a portion of said coupler head extending rearwardly of the point of pivotal connection of said head and stem, and said stem being formed with spaced arms rigidly united by means passing between said converging walls.

7. In draft rigging mechanism, the combination with a coupler stem, of a coupler head, and a pivot pin connecting said stem and head, said stem having spaced arms adapted to receive a portion of said coupler head between them and being provided rearwardly of said pivot pin with means for limiting the extent of lateral swinging of said head, and said head having in advance of said pivot pin a plurality of shoulders respectively overlapping the forward ends of said arms to prevent separation thereof.

8. In draft rigging mechanism, the combination with a coupler stem, of a coupler head, and a pivot pin connecting said stem and head, said stem having spaced arms adapted to receive a portion of said coupler head between them, said head having in advance of said pivot pin a plurality of shoulders respectively overlapping the forward ends of said arms to prevent separation thereof, said arms being rigidly united intermediate of their ends rearwardly of said pivot pin, and said head being provided with a rearwardly extending portion adapted to engage said stem rearwardly of said pivot pin to thereby limit the extent of lateral swinging of said head.

9. In draft rigging mechanism, the combination with a coupler stem, of a coupler head, a pivot pin connecting said stem and head, and means for centering said head with respect to said stem, said means involving a slide reciprocatingly mounted on said stem, said head being provided with oppositely disposed shoulders adapted to engage the forward end of said slide and being also provided with external forwardly converging faces immediately in advance of said shoulders.

10. In draft rigging mechanism, the combination with a laterally swinging coupler stem, of a coupler head, a pivot pin connecting said stem and head, and yielding means mounted on said stem for centering said head, said head being provided on opposite sides with shoulders adapted to engage and actuate said yielding means and being of reduced width adjacent to and in advance of said shoulders.

11. In draft rigging mechanism, the combination with a coupler stem, of a coupler head, and means for pivotally connecting said stem and head, said stem being provided with spaced arms and a tie bar rigidly uniting said arms rearwardly of said means, and said head being provided with a rearwardly extending portion projecting between said arms and formed with a recess adapted to receive said tie bar.

12. In draft rigging mechanism, the combination with a coupler stem, of a coupler head, means for pivotally connecting said stem and head, means integral with said stem adapted to engage said head and limit the extent of lateral swinging thereof, and means for centering said head, said centering means involving a slide mounted on said stem, said slide being formed of similar counterpart members each having a plurality of spaced hollow lugs disposed to the rear of said means for limiting the lateral swinging of said head, and means extending through said lugs for connecting said counterpart members, the ends of the corresponding lugs on said counterpart members abutting each other.

13. In draft rigging mechanism, the combination with a coupler stem, of a coupler head, and a pivot pin for pivotally connecting said stem and head, said stem being provided with a pivot pin opening and with a recess communicating with said opening, and said pivot pin having a tongue projecting into said recess and overlapping a stationary part of the car.

14. In draft rigging mechanism, the combination with a coupler stem having at its forward end a pivot pin opening and a recess extending rearwardly from said opening, of a coupler head having a corresponding pivot pin opening, and a pivot pin extending into said pivot pin opening and connecting said stem and head, and a removable member secured to the car for retaining said pivot pin in assembled position, said pivot pin having a tongue projecting into said recess and in normal position overlapping said removable member to an extent greater than the longitudinal travel of said coupler in one direction from its normal position.

15. In draft rigging mechanism, the combination with a coupler stem, of a carry-iron, a coupler head pivotally mounted on said stem so as to swing laterally on an axis normally offset with respect to said carry-iron, and a downwardly removable pin for pivotally connecting said head and stem, said pin having a tongue projecting at an angle to its axis and extending between and engaging said coupler stem and carry-iron.

16. In draft rigging mechanism, the combination with a coupler stem having a pivot pin opening, of a carry-iron, a coupler head pivotally mounted on said stem, and a downwardly removable pin for pivotally connecting said head and stem, said stem being provided on its under side and rearwardly of its pivot pin opening with a recess, and said pivot pin having a rearwardly extending tongue projecting into said recess and resting upon said carry-iron.

17. In draft rigging mechanism, the combination with a coupler stem having a pivot pin opening and a recess communicating therewith and extending on one side only of said opening, of a coupler head, and a pivot pin for pivotally connecting said stem and head, said pivot pin having at one end and projecting transversely to its axis a tongue extending into said recess.

18. In draft rigging mechanism, a car coupler provided with means whereby it may be pivotally mounted upon a railway vehicle, said coupler having a coupler head and being provided rearwardly of said head with forwardly converging lateral faces adapted to have extended contact with the respectively adjacent sills of said railway vehicle.

In testimony whereof I affix my signature.

WILLIAM KELSO.

Copies of this patent may be obtained for five cents each, by addressing the "Commissioner of Patents, Washington, D. C."